United States Patent Office.

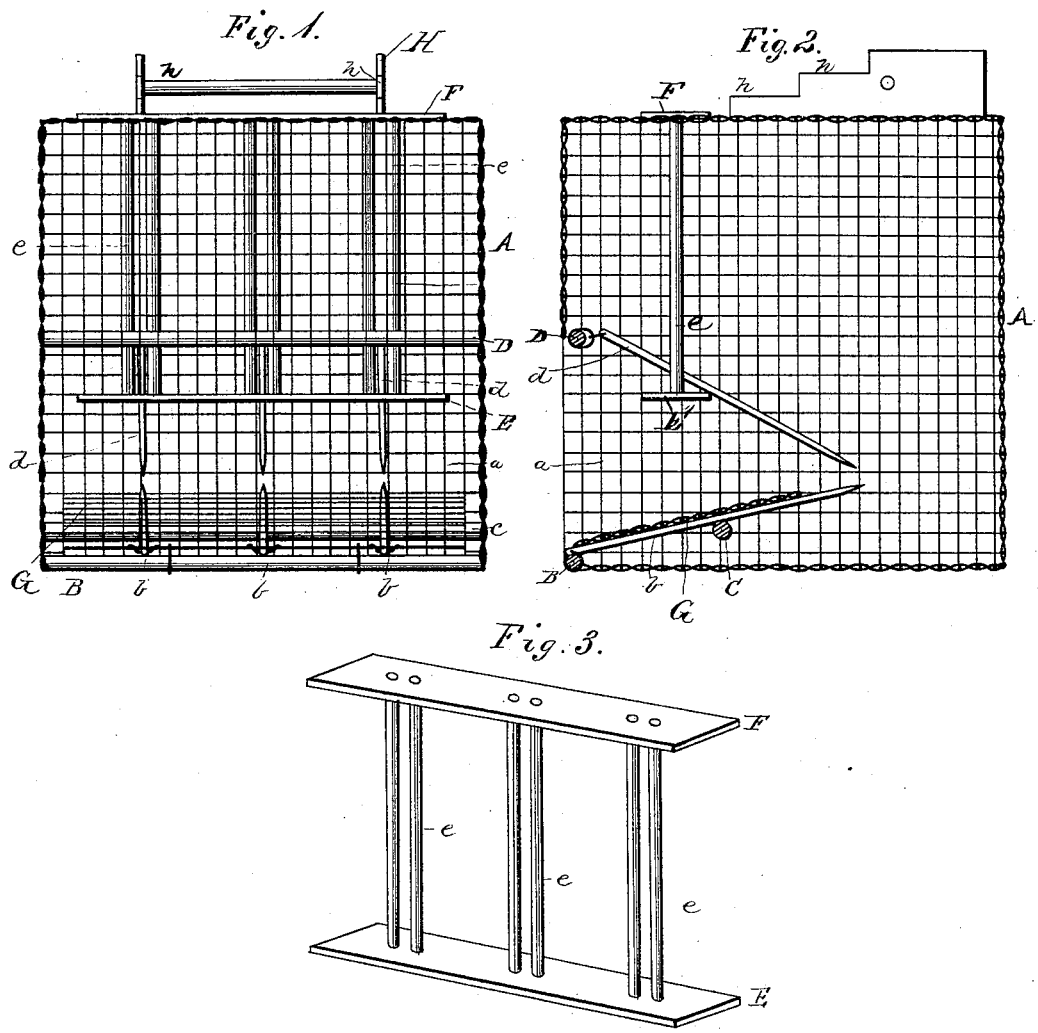

GEORGE THOMAS, OF TARKILN, VIRGINIA.

TRAP FOR FISH OR GAME.

SPECIFICATION forming part of Letters Patent No. 366,984, dated July 19, 1887.

Application filed April 23, 1887. Serial No. 235,898. (No model.)

*To all whom it may concern:*

Be it known that I, GEORGE THOMAS, a citizen of the United States, residing at Tarkiln, in the county of Patrick and State of Virginia, have invented certain new and useful Improvements in Traps for Fish and Game; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a front elevation of my invention. Fig. 2 is a transverse section. Fig. 3 is a detail perspective view of the plate or bars E for supporting the needles $d$.

The invention relates to improvements in animal-traps, being adapted to catch both fish and land animals; and it consists in the construction and novel combination of parts, as hereinafter set forth.

Referring to the accompanying drawings, A designates the box of wire-netting forming the casing of the trap, and having the lower part of one side open at $a$ to form an entrance. The casing rests upon the surface of the ground or the bottom of the stream or body of water in which it is placed with the opening $a$ adjacent thereto or downward.

B is a rod secured in the sides of the box A and running along the lower edges of the opening $a$, and $b\ b$ are a set of pins or teeth having their heels or outer ends secured loosely to the rod B, preferably by wires, upon which the said points are threaded through eyes, the wires being wrapped around the rod.

C is a rod passing from side to side of the box A at a point above the position of the rod B and sufficiently distant therefrom to support the pins $b\ b$ at about their central points, so that the pins incline upward and inward from the rod B, with their points free and extending inside the box.

D is a rod extending across the top of the opening $a$ and having secured to it the heels of the pins $d\ d$, similar to the pins $b\ b$, and with their said heels secured in a similar manner, so as to be loosely attached to the rod D. The said pins $d$ extend within the box and rest about centrally upon a plate or bar, E, which is suspended within the case by rods $e\ e$, having their lower ends secured to the bar E and arranged in pairs, so that one stands on each side of a pin, $d$, and prevents it from slipping laterally. The upper parts of the rods $e$ pass through the roof of the casing, and their upper ends are secured to a plate or bar, F, which rests loosely upon the roof of the casing.

G is a platform of wire or other suitable material, which lies upon the pins $b$ and prevents an entering animal from being wounded by said pins.

H is a frame made of side pieces and a cross-bar, and provided on its side pieces with similar opposite steps $h\ h$, of different heights, so that the bar F, and consequently the bar E, can be raised and set at different heights. The pins $d\ d$ can thus be held at different angles to the pins $b$, with the points more or less distant from the points of the latter.

The fish or other animals in entering raise the points of the upper pins, $d$, which turn loosely at their heels, and when the animal is inside the said pins drop, so as to prevent them from escaping.

The platform G is more particularly of use when the trap is on land, as it will prevent land animals from having their feet wounded by the lower pins, $b$. It is also of use in a water-trap, though not so necessary.

The opening $a$ in small traps preferably extends the entire length of the trap and for about one-half its height.

Having described this invention, what I claim is—

1. In an animal-trap for water or land use, the combination, with a casing, of a lower set of pins or teeth inclining upward and inward from the lower end of its entrance and an upper set of pins or teeth inclining, when in use, downward and inward from the upper edge of the entrance of the casing, and a vertically-adjustable bar above the trap connected to a horizontal bar within the trap, on which said upper set of pieces rests, substantially as specified.

2. In an animal-trap for water or land use, the combination, with the wire casing having the entrance $a$, of the pins or teeth $b\ b$, standing upward and inward from the lower edge of said entrance, the platform G, resting upon said pins or teeth, the vertically-adjustable pins or teeth $d\ d$, standing downward and inward from the upper edge of said entrance, and the frame H, comprising the side pieces having steps $h\ h$ and the bar F, substantially as specified.

3. The herein-described animal-trap, consisting of the wire casing A, provided with the entrance-opening $a$, the pins or teeth $b\ b$, standing upward and inward from the rod B and resting upon the rod C, secured at its ends on the sides of the casing, the platform G, resting on said pins or teeth $b\ b$, the upper teeth, $d$, standing downward and inward from the rod D, the frame composed of the bars E E and rods $e$, which rods rest in pairs against the opposite sides of the teeth or pins $d$, and the frame H, provided with the sets of shoulders $h$ of different heights, upon which the frame composed of the bars E F and rod $e$, and consequently the pins or teeth $d$, are adjusted upward, substantially as specified.

In testimony whereof I affix my signature in presence of two witnesses.

GEORGE THOMAS.

Witnesses:
C. E. SPANGLER,
JOHN HUBBARD.